United States Patent Office 3,432,701
Patented Mar. 11, 1969

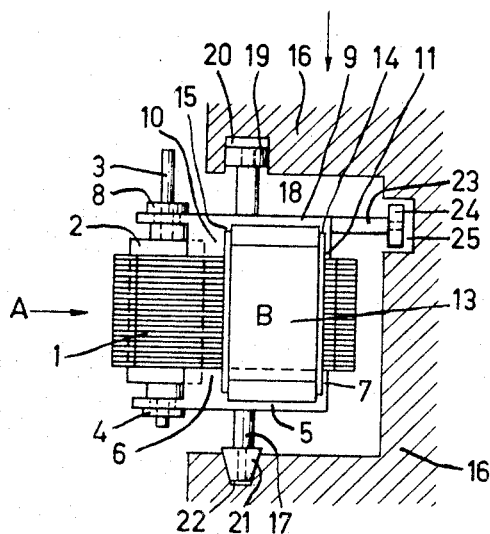
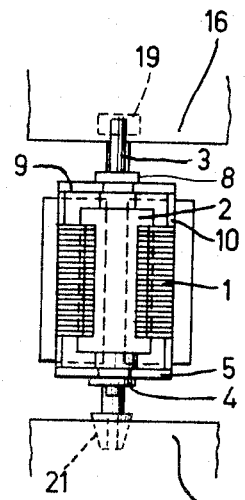
FIG. 1  FIG. 2
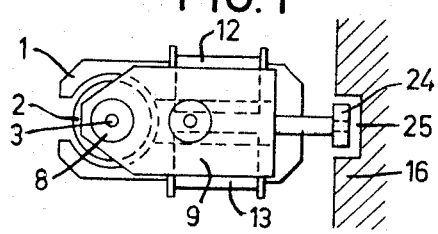
FIG. 3

3,432,701
VIBRATION DAMPING SUSPENSION FOR AN ELECTRIC MOTOR
Reinder Hendrik Dijken, Jolle Jager and Minne Krikke, Drachten, Netherlands, assignors to North American Philips Co., Inc., New York, N.Y., a corporation of Delaware
Filed Nov. 7, 1966, Ser. No. 592,505
Claims priority, application Netherlands, Dec. 22, 1965, 6516686
U.S. Cl. 310—47      5 Claims
Int. Cl. H02k 5/24

ABSTRACT OF THE DISCLOSURE

A vibration damping suspension for a small electric motor of the type used in electric shavers. A pair of damping shafts interconnect the stator and the motor housing. The center lines of the damping shafts are coincident, pass through the center of gravity of the motor, and are parallel to the center line of the rotor shaft. An alignment shaft normally positioned with respect to the center line of the rotor shaft interconnects the stator and the housing to prevent motor rotation. Elastic elements are interposed all shaft-housing connections.

---

The invention relates to small electric synchronous motors which incorporates a U-shaped stator and a rotor which is capable of rotating between the limbs of the stator and journalled in bearings which are supported by bearing shields located on either side of the stator and connected thereto.

In general, such a motor vibrates in operation. This is mainly due to the fact that the couple produced by the rotor and the stator is not constant. Vibration is very undesirable when such a motor is used in domestic apparatus such as dry-shaving apparatus and the like.

According to the invention, the transfer of the vibrations of the machine to the housing is practically eliminated if each of the bearing shields is provided with a damping shaft, the center lines of which are coincident, and pass through the centre of gravity of the machine, extend parallel to the rotor shaft and lie in the longitudinal plane of symmetry of the motor. The damping shaft is elastically connected to the motor housing. Additional means are provided to prevent rotation of the whole motor about the shaft passing through the centre of gravity.

These means may consist, for example, of stops provided in the housing and preferably made of elastic material.

According to a simple embodiment of the invention, one of the bearing shields has a third shaft which is also elastically connected with the housing which prevents rotation of the motor. According to a further aspect of the invention, the centre line of this third shaft lies in the longitudinal plane of symmetry of the machine and is at right angles to the rotor shaft.

The elastic connections may be constituted, for example, by springs. However, according to an embodiment of the invention, the first two shafts are preferably provided with sleeves or rings of elastic material fitting into corresponding cavities in the housing, while the third shaft has a ring of elastic material which is disposed with a certain amount of clearance in an aperture in the housing.

The invention will be described with reference to the drawing, which shows an embodiment of the invention and in which:

FIGURE 1 is a side elevation of an electric synchronous motor suspended in a housing;

FIGURE 2 is an elevation of the motor of FIGURE 1 viewed in the direction of the arrow A, and FIGURE 3 is a plan view of the motor of FIGURE 1.

In the figures, reference numeral 1 designates a laminated U-shaped stator between the limbs of which a permanent magnetic rotor 2 can rotate. This rotor 2 has a shaft 3; the lower end of this shaft 3 is journalled in a sleeve 4 which is incorporated in a bearing shield 5. This bearing shield 5 is provided with extensions 6 and 7 bearing on the stator. The upper end of the shaft 3 drives the rotating knives of a dry-shaving apparatus. This upper end is journalled in a sleeve 8 accommodated in a bearing shield 9 the latter of which provided with extensions 10 and 11 again bearing on the stator. The bearing shields 5 and 9 are identical and are interconnected in a manner not shown; this connection may be established, for example, by means of a bolt disposed between the limbs of the stator or by two bolts located on either side of the stator which pass through ears and are secured to the shields. Alternatively, provision may be made for clamping the members.

On the stator two energizing coils 12 and 13 are provided which are fixed by cams 14 and 15 to the bearing shields.

This motor has to be suspended in a housing 16. For this purpose, the bearing shields 5 and 9 are each provided with damping shafts 17 and 18, respectively. The centre lines of these shafts are located on a line which extends parallel to the shaft of the rotor 2, lies in the plane of symmetry of the motor and passes through the centre of gravity B thereof. The shaft 18 is provided with a rubber ring 19 which is disposed in an aperture 20 of the housing 16 with a minimum amount of clearance. The shaft 17 is provided at its end with a conical rubber sleeve 21 fitting into a corresponding aperture 22 of the housing 16.

Moreover, the shield 9 has an alignment shaft 23, the center line of which lies in the plane of symmetry of the motor, but is at right angles to the rotor shaft. This alignment shaft 23 is provided at its end with a rubber ring 24 disposed with a certain amount of clearance in an aperture 25 of the housing.

It has been found that, when the motor is suspended in the manner described above, substantially no vibrations are transferred to the housing, while the rubber ring 24 in the opening 25 prevents the rotation of the whole motor. Moreover, any vibrations due to incomplete balancing of the rotor are substantially not transferred to the housing, since the movement of the shaft passing through the centre of gravity caused by these vibrations is absorbed by the elastic suspension.

The embodiment described is economical to manufacture, readily assembled and has proved to be satisfactory in use. It is possible to make the rings and sleeves out of an elastic synthetic substance or to suspend the shafts on spring mountings.

What is claimed is:

1. A vibration damping suspension for an electric motor comprising: a housing, a stator having U-shaped limbs, a rotor having a rotor shaft interposed between said stator limbs, a bearing shield mounted at each end of said stator, damping shaft means coupling said stator and said housing wherein the center line of said damping shaft means passes through the center of gravity of said motor, lies in the plane of symmetry of said motor and is parallel with the center line of said rotor shaft, and means for preventing rotation of said motor with respect to said housing.

2. A vibration damping suspension according to claim 1 wherein: said damping shaft means comprise a pair of damping shafts extending in opposite directions from said stator and having coincident central axes; said means for preventing rotation of said motor with respect to said housing comprises an alignment shaft coupling said stator to said housing, wherein the center line of said alignment shaft lies in the plane of symmetry of said motor and is at right angles to the center line of said rotor shaft.

3. A vibration damping suspension according to claim 2 wherein: first elastic means are interposed between said damping shafts and said housing.

4. A vibration damping suspension according to claim 3 wherein: said first elastic means comprise an elastic sleeve surrounding each of said damping shafts; said housing includes a pair of cavities located adjacent said damping shafts and said sleeves are press-fit into said cavities.

5. A vibration damping suspension according to claim 4 wherein: said housing includes a third cavity located opposite said alignment shaft, and an elastic sleeve surrounds said alignment shaft and is movably disposed in said third cavity.

References Cited

UNITED STATES PATENTS

| 2,509,868 | 5/1950 | Irgang | 310—47 X |
| 3,206,850 | 9/1965 | Jepson | 310—51 X |
| 3,349,263 | 10/1967 | Jepson et al. | 310—47 |

WARREN E. RAY, Primary Examiner.

U.S. Cl. X.R.

310—51, 156